(12) United States Patent
Won et al.

(10) Patent No.: US 11,358,199 B2
(45) Date of Patent: Jun. 14, 2022

(54) APPARATUS AND METHOD FOR CORRECTING VEHICLE MEMBER

(71) Applicants: Hyundai Motor Company, Seoul (KR); Kia Motors Corporation, Seoul (KR)

(72) Inventors: Young Min Won, Seoul (KR); Dae Weon Kim, Jeonju-Si (KR); Tea Jung Yoon, Ulsan (KR); Yong Baek Suh, Cheonan-Si (KR); Kyung Bum Kim, Bongdong-Eup (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 191 days.

(21) Appl. No.: 16/838,543

(22) Filed: Apr. 2, 2020

(65) Prior Publication Data
US 2020/0230678 A1 Jul. 23, 2020

Related U.S. Application Data

(62) Division of application No. 15/598,111, filed on May 17, 2017, now Pat. No. 10,639,692.

(30) Foreign Application Priority Data

Dec. 16, 2016 (KR) .................. 10-2016-0173037

(51) Int. Cl.
| B21D 1/12 | (2006.01) |
| B21D 1/14 | (2006.01) |
| B25B 5/06 | (2006.01) |
| G01B 5/00 | (2006.01) |

(52) U.S. Cl.
CPC .............. *B21D 1/12* (2013.01); *B21D 1/145* (2013.01); *B25B 5/061* (2013.01); *G01B 5/0025* (2013.01); *Y10S 72/705* (2013.01)

(58) Field of Classification Search
CPC .......... Y10S 72/705; B21D 1/06; B21D 1/10; B21D 1/12; B21D 1/14; B21D 1/145; B25B 5/04; B25B 5/06; B25B 5/061; B25B 5/145; G01B 5/0025; B23Q 16/005
USPC ........ 72/705, 295–299, 308–309, 17.3, 18.1, 72/18.2; 33/608
See application file for complete search history.

(56) References Cited

U.S. PATENT DOCUMENTS

| 3,731,513 A | 5/1973 | Kindermann et al. |
| 3,952,572 A | 4/1976 | Mergler et al. |
| (Continued) | | |

FOREIGN PATENT DOCUMENTS

| CA | 2091108 A1 | 9/1993 | |
| EP | 2824327 A1 * | 1/2015 | ............... B21D 1/10 |
| (Continued) | | | |

*Primary Examiner* — Shelley M Self
*Assistant Examiner* — Katie L. Parr
(74) *Attorney, Agent, or Firm* — Morgan, Lewis & Bockius LLP

(57) ABSTRACT

An apparatus and a method for correcting a vehicle member, by which twisting or deflection of a vehicle member including a side member of the vehicle, may be corrected, may be disclosed, wherein the apparatus for correcting a vehicle member includes a base extending in a lengthwise direction thereof, and a plurality of correction units disposed on the base to be movable.

3 Claims, 22 Drawing Sheets

(56) References Cited

U.S. PATENT DOCUMENTS

| | | | |
|---|---|---|---|
| 4,050,287 A | * | 9/1977 | Borup ............... B21D 1/14 72/457 |
| 4,579,614 A | | 4/1986 | Burmeister et al. |
| 4,719,704 A | | 1/1988 | Hogg |
| 4,731,936 A | | 3/1988 | Aldrich et al. |
| 6,189,364 B1 | | 2/2001 | Takada |
| 8,943,869 B2 | | 2/2015 | Li et al. |
| 2014/0021339 A1 | | 1/2014 | Seifert et al. |
| 2016/0250675 A1 | | 9/2016 | Ito |

FOREIGN PATENT DOCUMENTS

| | | | | |
|---|---|---|---|---|
| FR | 2703447 A1 | * | 10/1994 | ............... B21D 1/14 |
| JP | 2008043964 A | * | 2/2008 | ............... B21D 1/12 |
| KR | 10-0252004 B1 | | 4/2000 | |
| KR | 10-0758107 B1 | | 9/2007 | |
| KR | 10-2008-0006367 A | | 1/2008 | |

\* cited by examiner

APPARATUS AND METHOD FOR CORRECTING VEHICLE MEMBER

CROSS-REFERENCE(S) TO RELATED APPLICATIONS

The present application is a Divisional of U.S. patent application Ser. No. 15/598,111, filed May 17, 2017, which claims priority to Korean Patent Application No. 10-2016-0173037, filed on Dec. 16, 2016, the entire contents of which applications are incorporated herein for all purposes by these references.

BACKGROUND OF THE INVENTION

Field of the Invention

The present invention relates to an apparatus and a method for correcting a vehicle member, and more particularly to an apparatus and a method for correcting a vehicle member, by which twisting or deflection of a vehicle member, such as a side member of the vehicle, may be corrected.

Description of Related art

A vehicle may have a main support structure including a plurality of frames, a plurality of panels, and a plurality of members, and the like.

Meanwhile, a vehicle member including a side member or a cross member used in a vehicle body may extend in a lengthwise direction thereof while having an H-shaped or C-shaped cross-section.

After the vehicle member is formed through pressing or the like, the vehicle member is deflected or twisted, and accordingly, the deflection and twisting of the vehicle member is corrected by use of a correction apparatus.

However, because the conventional correction apparatus simply quantitatively corrects the vehicle member after manually setting the vehicle member, it may be difficult to secure the quality of the vehicle member.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and a method for precisely correcting a vehicle member, by which twisting or deflection of a vehicle member, such as a side member of the vehicle, may be corrected.

The technical problems to be solved by the present invention are not limited to the aforementioned problems, and any other technical problems not mentioned herein will be clearly understood from the following description by those skilled in the art to which the present invention pertains.

According to various aspects of the present invention, an apparatus for correcting a vehicle member may include a base extending in a lengthwise direction thereof, and a plurality of correction devices disposed on the base to be movable.

Each of the correction devices may include a correction body disposed in the base, and a clamp device disposed below the correction body.

The clamp device may include a clamp body, two clamp arms pivotally disposed in the clamp body, and two clamp cylinders configured to individually drive the two clamp arms.

The clamp bodies may be connected to lower portions of the correction body, and one of the two clamp arms may be disposed in the clamp body to be movable.

Connection members may be disposed in rods of the clamp cylinders, sliders may be pivotally disposed in the connection members through pivot shafts, and the sliders may be disposed to be movable along the clamp arms.

Each of the sliders may have a guide boss, and the corresponding clamp arm may have a guide groove by which the guide boss is guided.

The apparatus may further include slider guides configured to guide movements of the sliders.

Each of the sliders may have a guide surface and the corresponding slider guide may have a guide surface configured to guide the guide surface of the slider, and the guide surface of the slider guide may include a first guide surface configured to guide upward movement of the slider and a second guide surface configured to guide downward movement of the slider.

The correction body may have two symmetrically disposed correction cylinders.

Upper end portions of the correction cylinders may be pivotally disposed in the correction bodies by the pivot shafts, pivot members may be disposed at lower end portions of the correction cylinders, and the pivot members may be pivotally connected to the clamp devices by the pivot shafts.

According to another aspect of the present invention, an apparatus for correcting a vehicle member may include a base extending in a lengthwise direction thereof, and a plurality of correction devices disposed on the base to be movable, and some of the plurality of correction devices may have clamp devices configured to clamp the vehicle member, and the other correction devices may have clamp devices configured to clamp the vehicle member, and correction cylinders configured to correct the vehicle member clamped by the clamp devices.

Measurement devices configured to measure the vehicle member may be disposed in the clamp devices.

According to still another aspect of the present invention, a method for correcting a vehicle member by use of the above-described apparatus may include introducing the vehicle member into the plurality of correction devices, primarily clamping the vehicle member, measuring the primarily clamped vehicle member by the measurement device, determining a success or a failure by comparing a value measured by the measurement device with an allowable value, and when the measured value corresponds to a failure, correcting the vehicle member after secondarily clamping the vehicle member.

The method may further include measuring a value of the vehicle member after the vehicle member is corrected, and comparing the value measured by the measurement device with the allowable value and when the measured value corresponds to a success, unclamping and discharging the vehicle member.

The methods and apparatuses of the present invention have other features and advantages which will be apparent from or are set forth in more detail in the accompanying drawings, which are incorporated herein, and the following Detailed Description, which together server to explain certain principles of the present invention.

Figure 1:
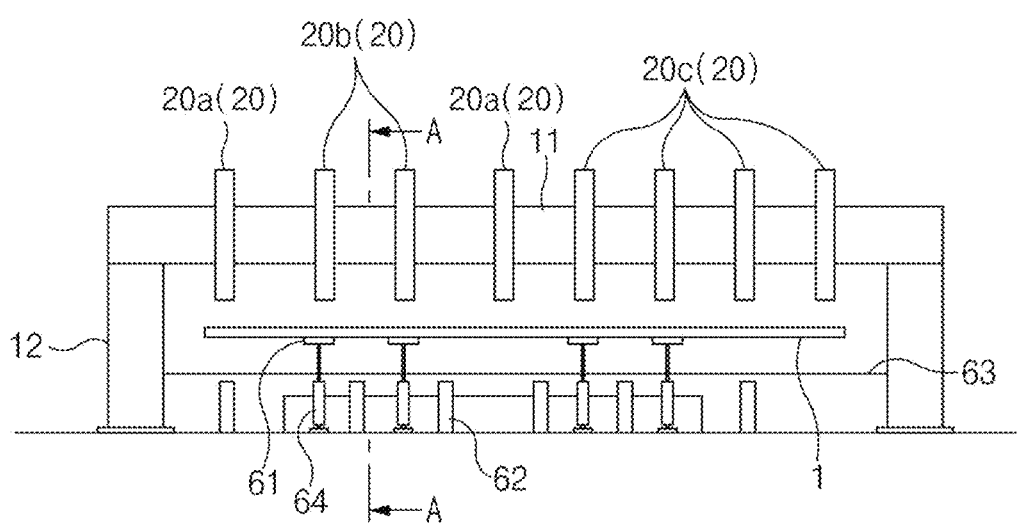
FIG. 1 is a side view illustrating an apparatus for correcting a vehicle member according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to convey not only the exemplary embodiments, but also various alternatives, modifications, equivalents and other embodiments, which may be included within the spirit and scope of the invention as defined by the appended claims.

Referring to FIG. 1, an apparatus 100 for correcting a vehicle member according to an exemplary embodiment of the present invention may include a base 11 extending in a lengthwise direction thereof, and a plurality of correction units 20 disposed along the base 11 to be movable.

The base 11 may have a structure extending in the lengthwise direction thereof, and the base 11 may be located at a specific height from the bottom surface of production line by a pair of legs 12.

The plurality of correction devices 20 may be disposed along the lengthwise direction of the base 11, and the correction devices 20 may be disposed to be movable along the lengthwise direction of the base 11.

Figure 3:
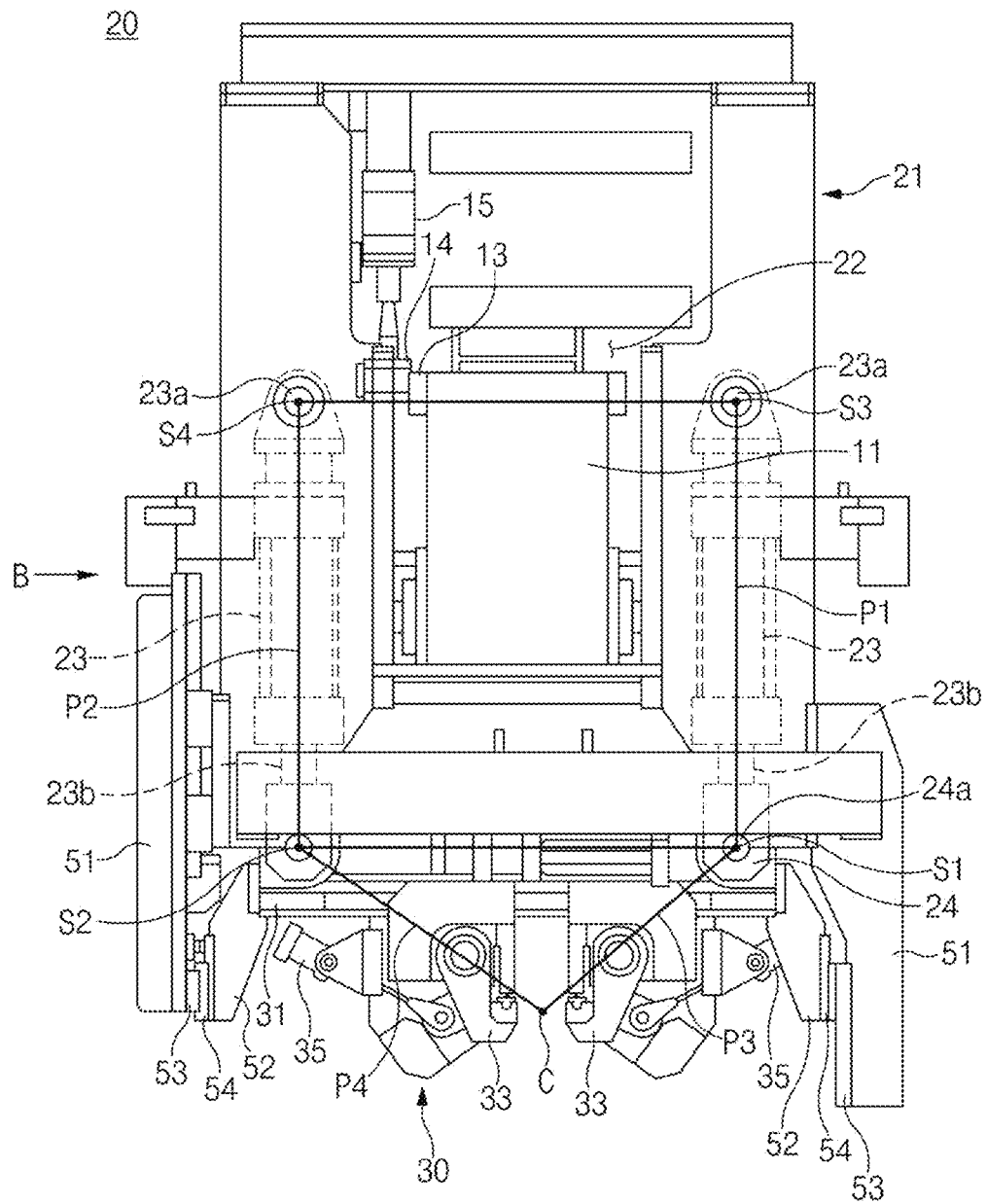
FIG. 3 is a view illustrating a correction device of the apparatus for correcting a vehicle member according to an exemplary embodiment of the present invention.

As illustrated in FIG. 3, a rack 13 may be formed on at least one side surface of the base 11 to extend along the lengthwise direction of the base 11, and a pinion gear 14 engaged with the rack 13 and a motor 15 that rotates the pinion gear 14 may be disposed in each of the correction devices 20. Accordingly, as the pinion gear 14 is rotated by the motor 15, the correction device 20 may be moved along the rack 13 of the base 11, and through the present case, a location of the correction device 20 in the lengthwise direction of the base 11 may be individually adjusted.

Figure 2:
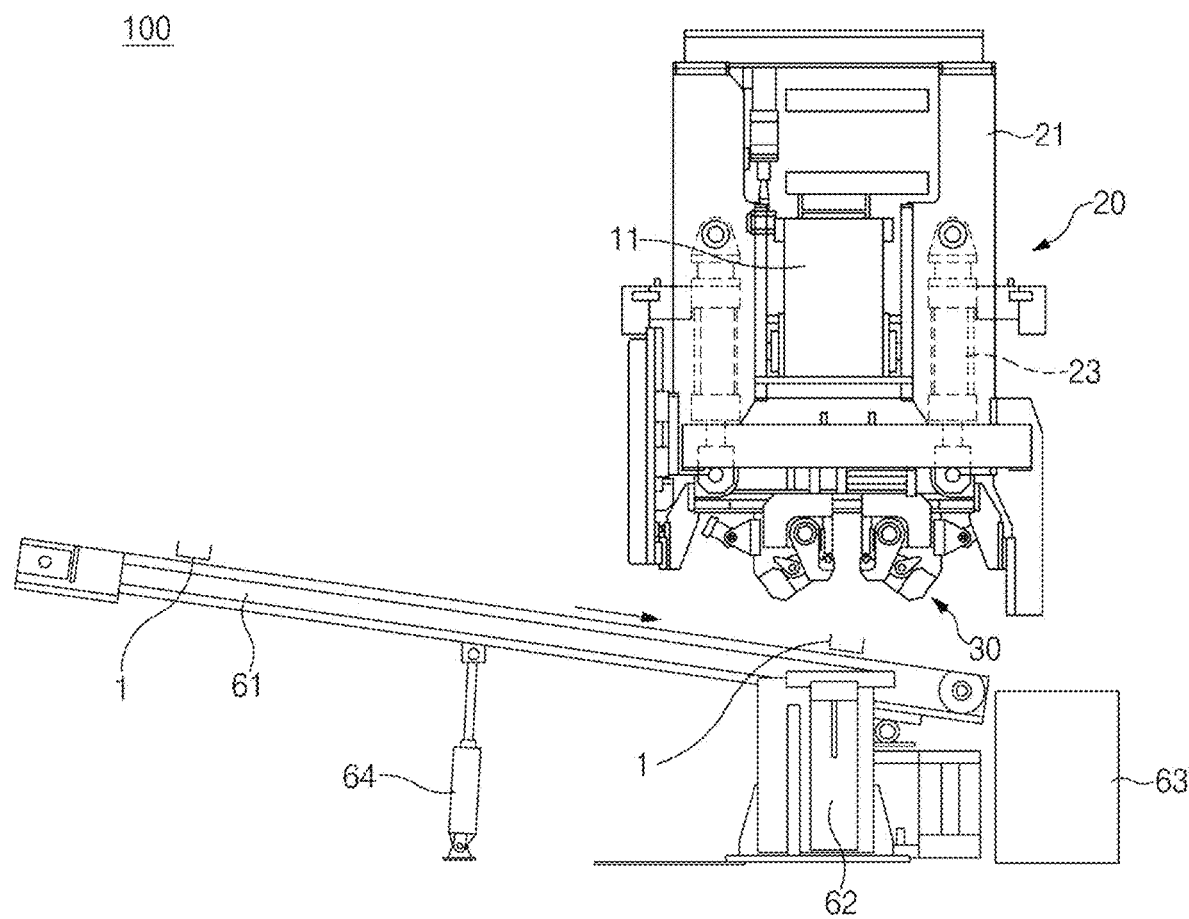
FIG. 2 is a sectional view taken along line A-A of FIG. 1.

As illustrated in FIG. 1 and FIG. 2, a plurality of feeding conveyors 61 that feeds the vehicle member 1 towards the plurality of correction devices 20 may be disposed in a side direction of the base 11 to be inclined, and lower end portions of the feeding conveyors 61 may be spaced downwards apart from the lower sides of the correction devices 20. An inclination adjusting cylinder 64 may be disposed in each of the feeding conveyors 61.

A plurality of lifters 62 may be disposed on the vertically lower sides of the correction devices 20, and the vehicle member 1 fed by the feeding conveyors 61 may be lifted towards the correction devices 20 by the plurality of lifters 62.

Discharge conveyors 63 that discharge the vehicle member 1 corrected by the correction devices 20 may be disposed adjacent to lower end portions of the feeding conveyors 61.

Figure 4:
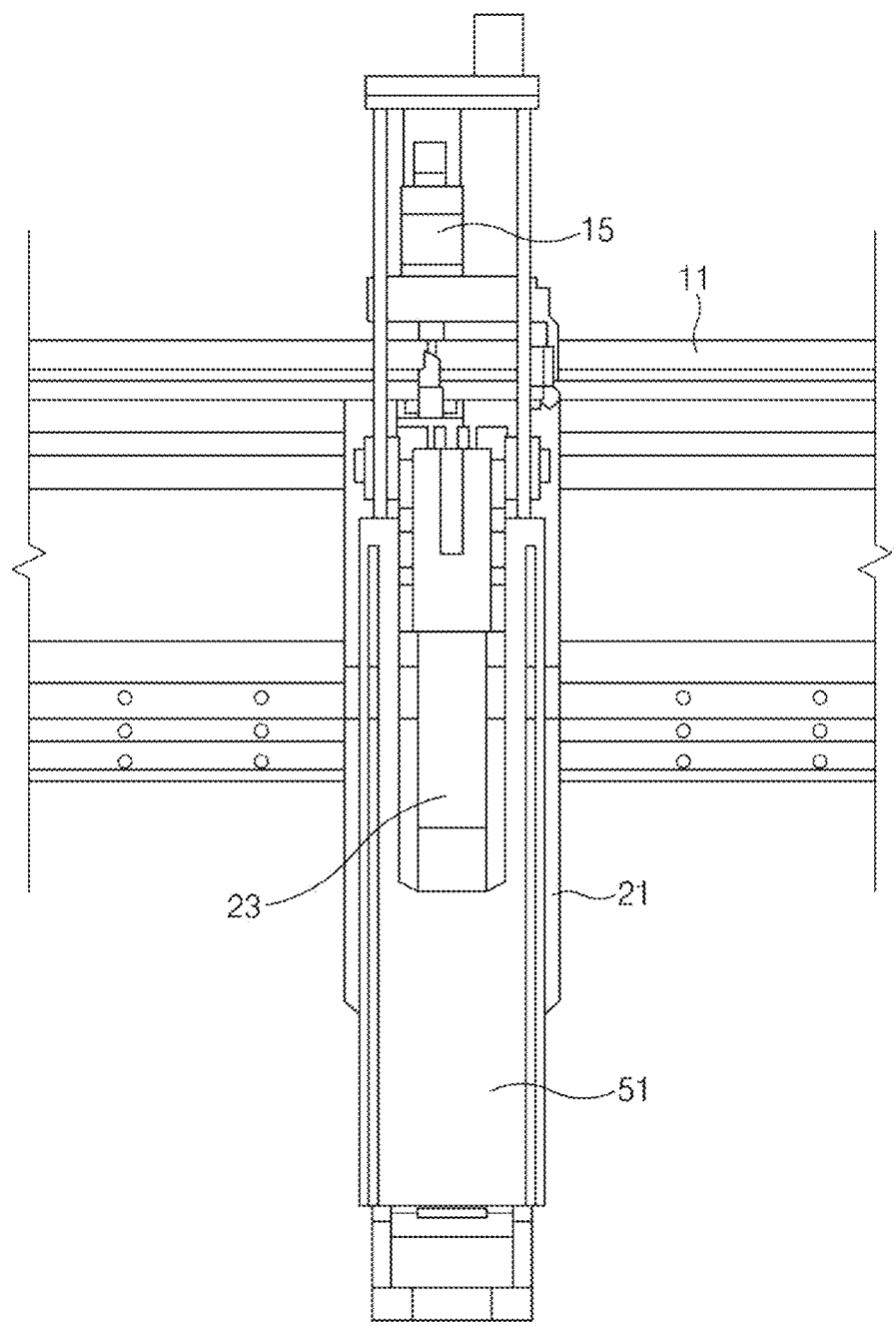
FIG. 4 is a side view viewed from a direction of arrow B of FIG. 3.

Referring to FIG. 3 and FIG. 4, each of the correction devices 20 may include a correction body 21 disposed in the base 11, and a clamp device 30 disposed below the correction body 21.

The correction body 21 may have an opening 22, through which the base 11 passes. Two correction cylinders 23 may be disposed in the internal of the correction body 21, and the two correction cylinders 23 may be disposed symmetrically with respect to the correction body 21.

Upper end portions of the correction cylinders 23 may be pivotally disposed in the internal of the correction body 21 by pivot shafts 23a, pivot members 24 may be disposed at the lower end portions of the correction cylinders 23 and the pivot members 24 may be pivotally connected to the clamp device 30 by the pivot shafts 24a.

Figure 5:
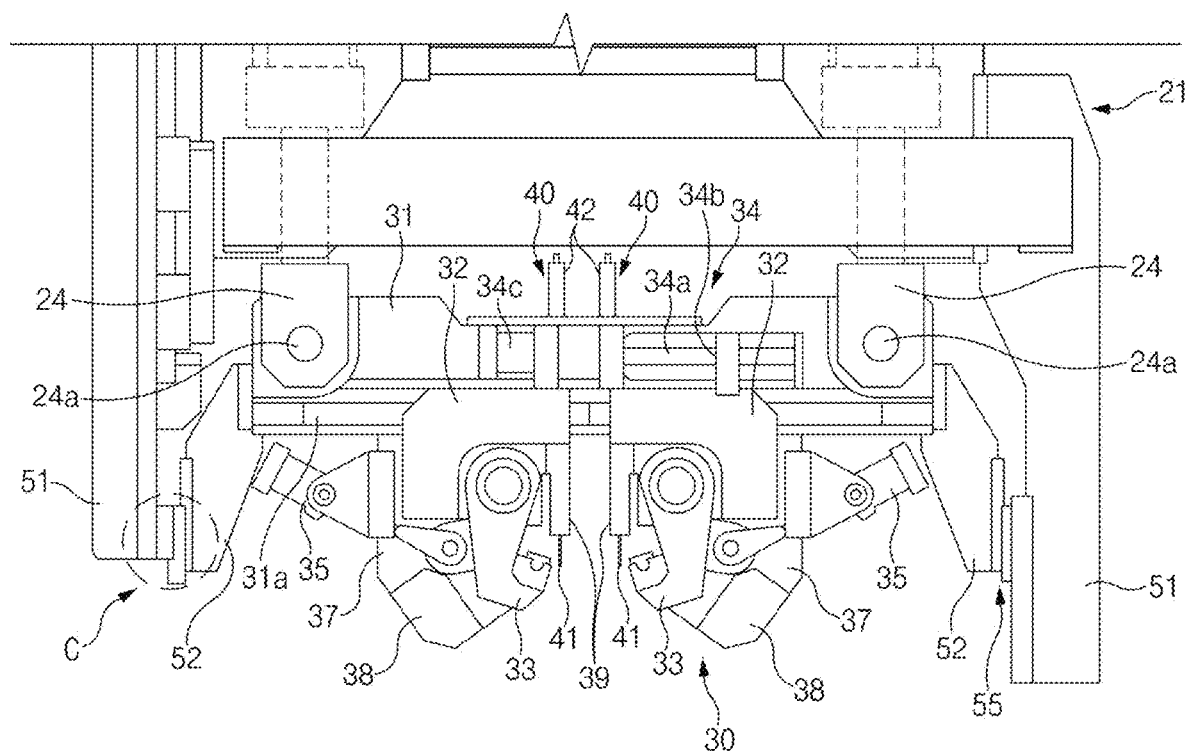
FIG. 5 is a view illustrating a clamp device of the apparatus for correcting a vehicle member according to an exemplary embodiment of the present invention.
Figure 6:
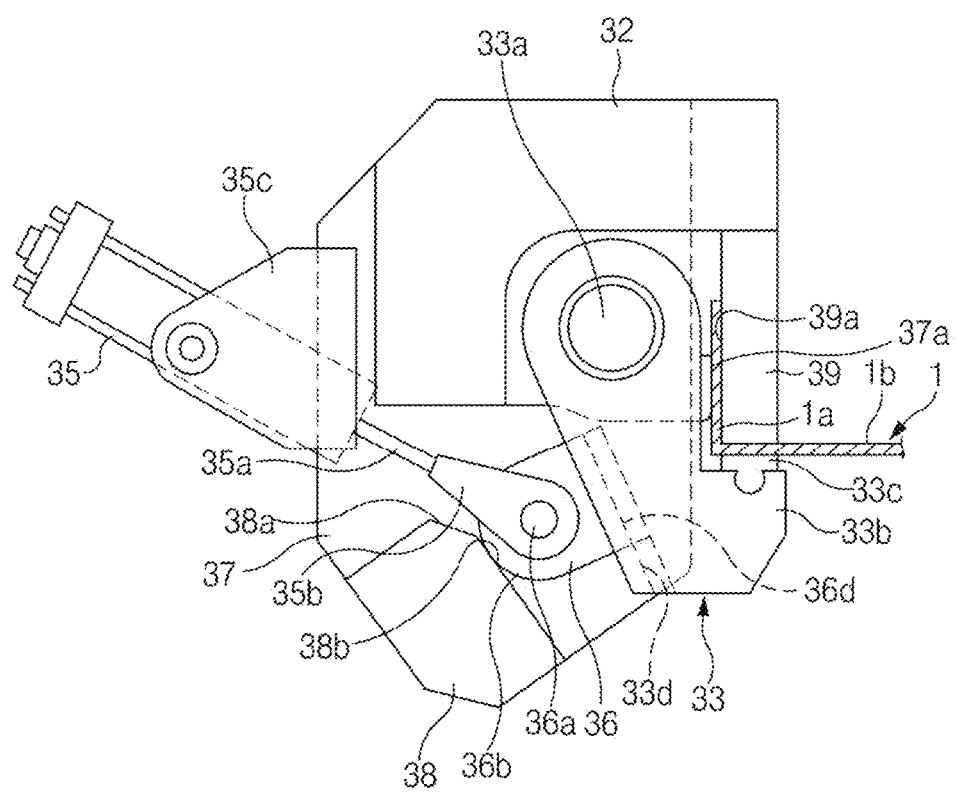
FIG. 6 is an enlarged view illustrating a portion of the clamp device of FIG. 5.

Referring to FIG. 5 and FIG. 6, the clamp device 30 may include a clamp body 31, two clamp arms 33 pivotally disposed in the clamp body 31, and two clamp cylinders 35 that individually drives the two clamp arms 33.

The clamp body 31 may be connected to a lower side of the correction body 21, a guide part 31a may be provided along a lengthwise direction of the clamp body 31, and at least one 32 of the two first plates 32 may be disposed in the guide part 31a to be movable.

Two clamp arms 33 may be disposed in the two first plates 32, respectively, and the clamp arm 33 may be pivotally disposed in the corresponding first plate 32 through the pivot shaft 33a.

A linear guide 34 may be disposed in the clamp body 31, and the linear guide 34 may be located above the guide part 31a. The linear guide 34 may include a screw shaft 34a, a nut member 34b disposed in the screw shaft 34a to be movable in a screwing manner, and a motor 34c that rotates the screw shaft 34a.

The nut member 34b of the linear guide 34 may be connected to one of the two first plates 32, and accordingly, one 32 of the two first plates 32 and the clamp arm 33 connected to the first plate 32 may be moved as the nut member 34b is moved, so an interval between the two clamp arms 33 may be relatively adjusted as one 33 of the two clamp arms 33 is moved. Here, the lengthwise direction of the clamp body 31 corresponds to the widthwise direction of the correction body 21, and accordingly, the clamp arm 33 may be moved in the widthwise direction of the correction body 21 as the first plate 32 is moved along the guide part 31a.

The clamp arms 33 may be pivotally disposed by the pivot shaft 33a. A boss 33b protrudes from a lower end portion of each of the clamp arms 33, and a support member 33c that supports a portion of a web 1b of the vehicle member 1 may be fitted with the corresponding boss 33b.

Two second plates 37 may be individually coupled to the two first plates 32 through coupling members, and the two clamp cylinders 35 may be disposed in the two second plates 37 by the medium of brackets 35c, respectively.

Clamp blocks 39 may be individually disposed at peripheries on the second plates 37 to face each other, first insertion surfaces 37a may be formed at the opposite peripheries of the second plates 37, and second insertion surfaces 39a may be formed at peripheries of the clamp blocks 39. Accordingly, the first insertion surfaces 37a of the second plates 37 and the second insertion surfaces 39a of the clamp blocks 39 may be spaced apart from each other by a thickness corresponding to flanges 1a of the vehicle member 1, and through the present case, the flanges 1a of the vehicle member 1 may be inserted between and supported by the first insertion surfaces 37a of the second plates 37 and the second insertion members 39a of the insertion members 39.

Intermediate parts of the clamp cylinders 35 may be disposed in the brackets 35c, connection members 35b may be disposed in the rods 35a of the clamp cylinders 35, and sliders 36 may be pivotally disposed in the connection members 35b through the pivot shafts 36a. The sliders 36 may be disposed to be movable along the clamp arms 33, and the clamp arms 33 may be pivoted through movement of the sliders 36.

Figure 11:
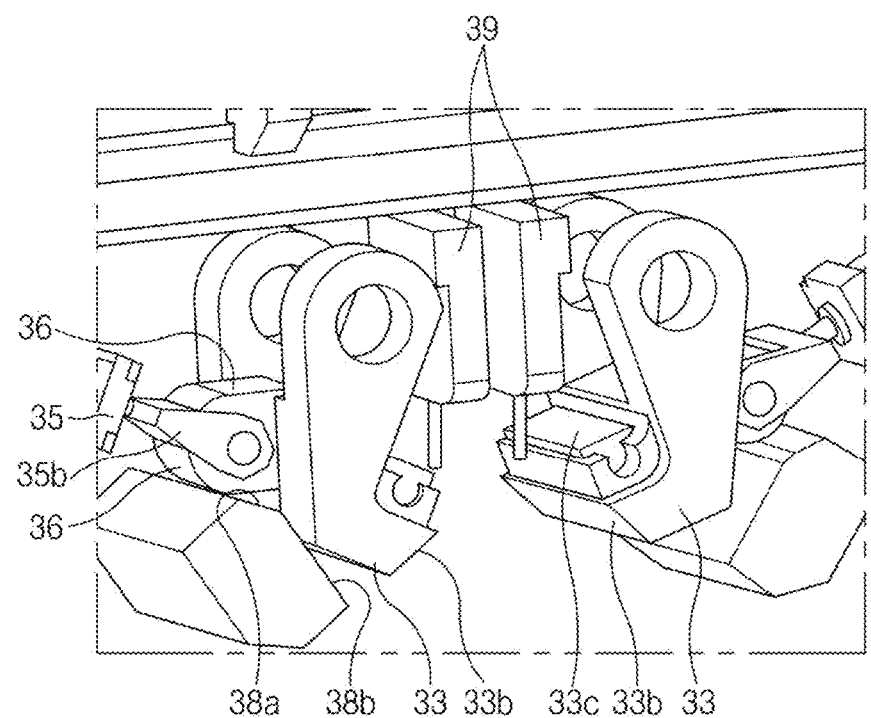
FIG. 11 is a view illustrating a state in which sliders are moved to upper portions of the clamp arms by rods of clamp cylinders of the apparatus for correcting a vehicle member according to an exemplary embodiment of the present invention.
Figure 13:
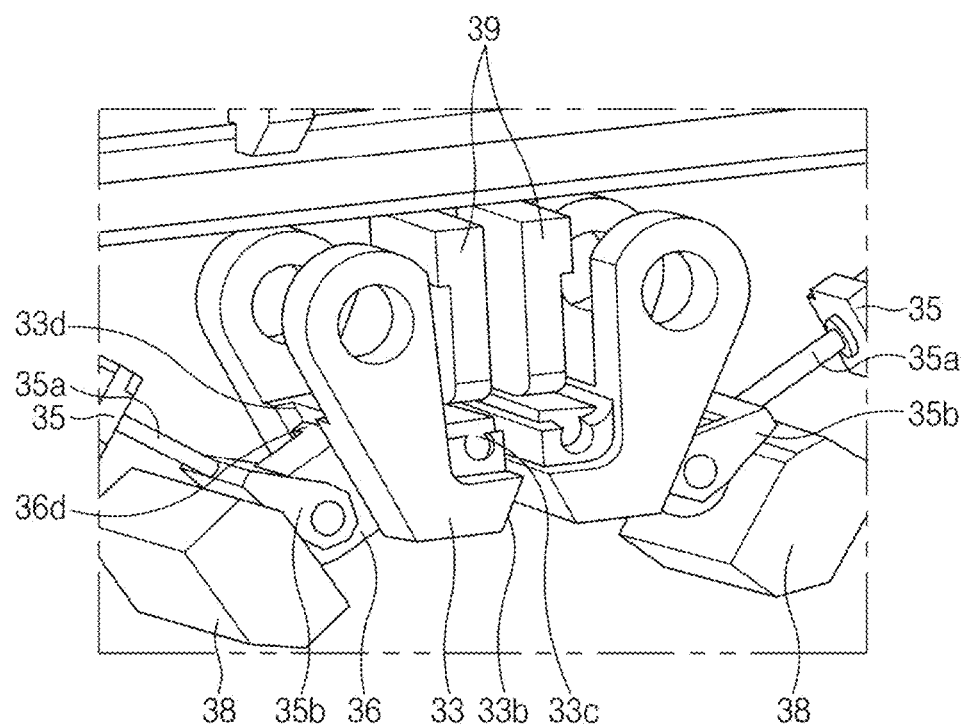
FIG. 13 is a view illustrating a state in which the sliders are moved to lower end portions of the clamp arms by the rods of the clamp cylinders of the apparatus for correcting a vehicle member according to an exemplary embodiment of the present invention.

As illustrated in FIG. 6, FIG. 11, and FIG. 13, the sliders 36 may have guide bosses 36d, the clamp arms 33 may have guide grooves 33d by which the guide bosses 36d of the sliders 36 are guided, and the guide grooves 33d may be formed at locations that are spaced apart from the pivot shafts 33a of the clamp arms 33 by a specific interval. Accordingly, the sliders 36 may be moved as the rods 35a of the clamp cylinders 35 are moved forwards and rearwards, and the clamp arms 33 may be pivoted about the pivot shafts 33a through movement of the sliders 36.

Figure 8:
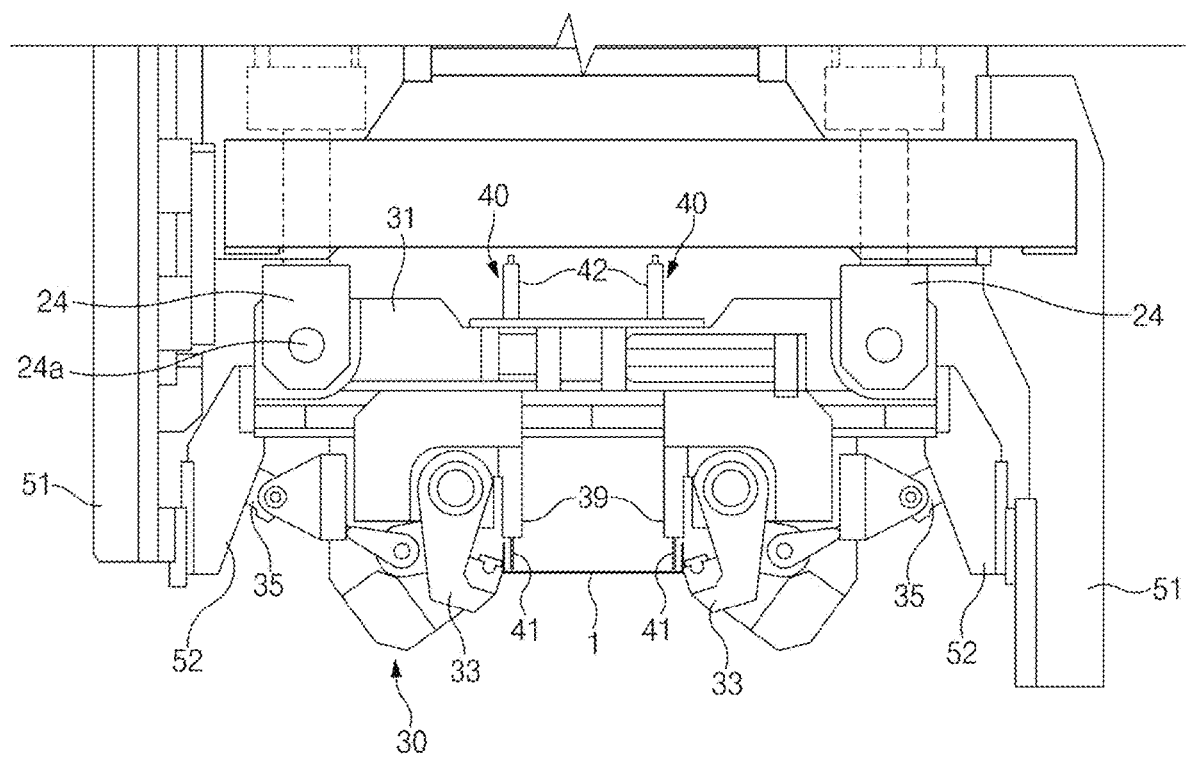
FIG. 8 is a view illustrating a state in which two clamp arms of the apparatus for correcting a vehicle member are widened according to an exemplary embodiment of the present invention.

As illustrated in FIG. 11, when the rods 35a of the clamp cylinders 35 are moved rearwards at a full stroke, the guide bosses 36d of the sliders 36 are moved to upper end portions of the guide grooves 33d of the clamp arms 33, and accordingly, the two clamp arms 33 may be pivoted in a direction in which the clamp arms 33 are widened as illustrated in FIG. 8.

Figure 9:
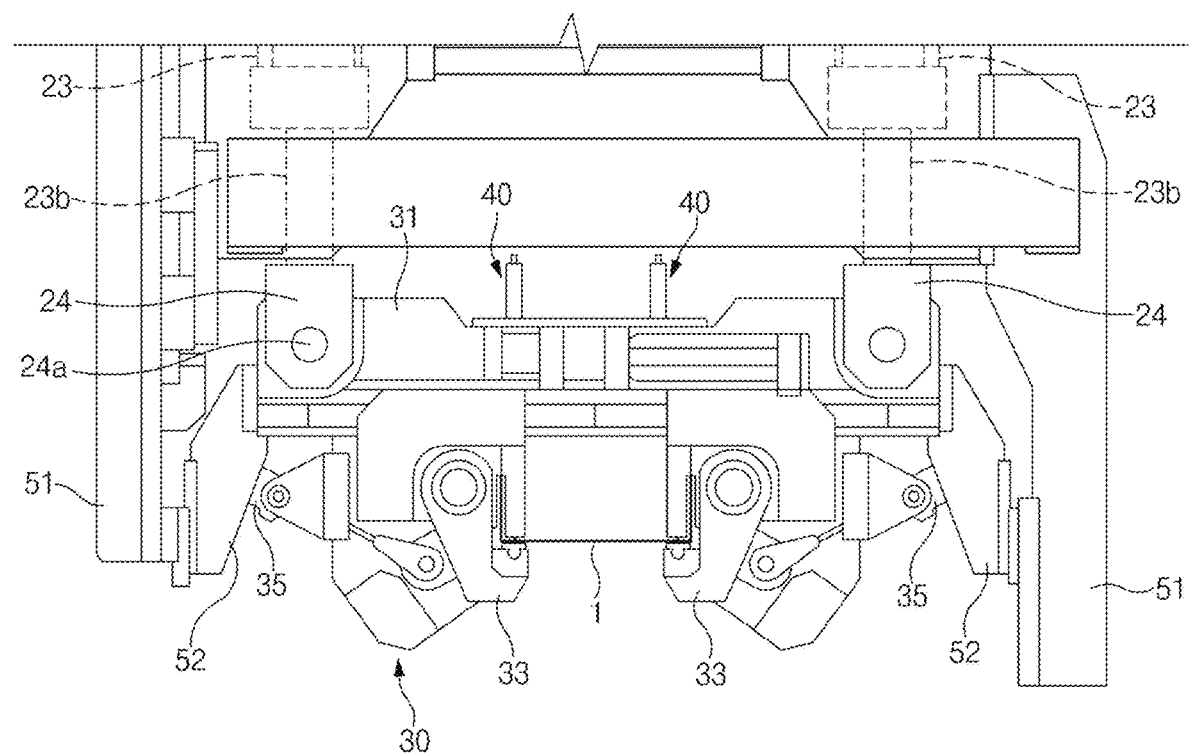
FIG. 9 is a view illustrating a state in which the two clamp arms of the apparatus for correcting a vehicle member are contracted according to an exemplary embodiment of the present invention.
Figure 12:
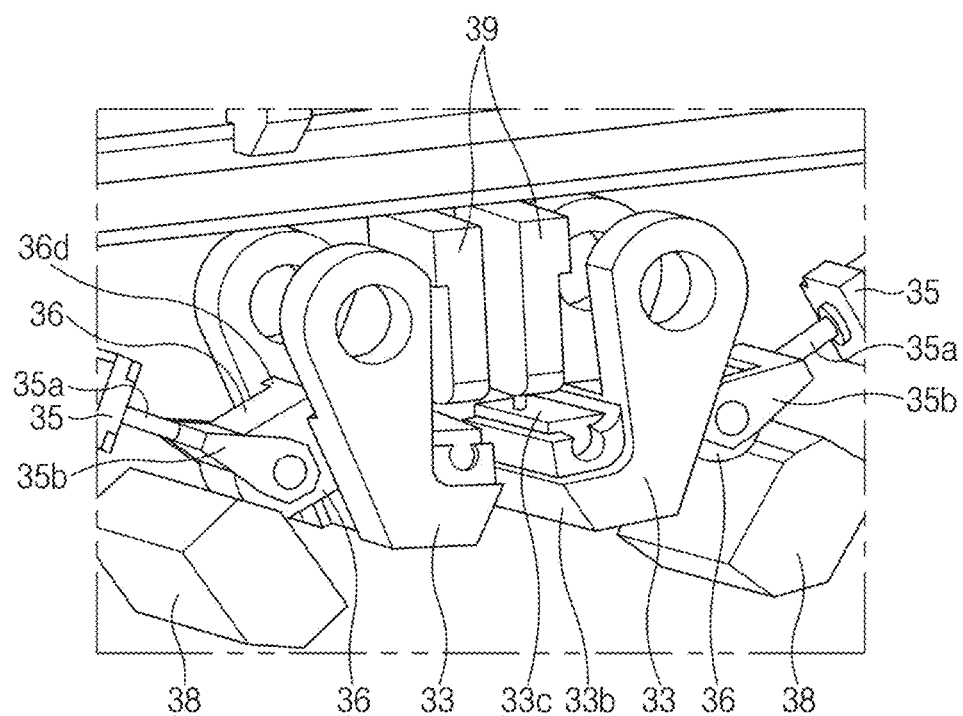
FIG. 12 is a view illustrating a state in which the sliders are moved to intermediate parts of the clamp arms by the rods of the clamp cylinders of the apparatus for correcting a vehicle member according to an exemplary embodiment of the present invention.

As illustrated in FIG. 12, when the rods 35a of the clamp cylinders 35 are moved forwards, the guide bosses 36d of the sliders 36 are moved to an intermediate portion of the guide grooves 33d of the clamp arms 33, and accordingly, the two clamp arms 33 may be pivoted in a direction in which the clamp arms 33 are contracted as illustrated in FIG. 9.

Figure 10:
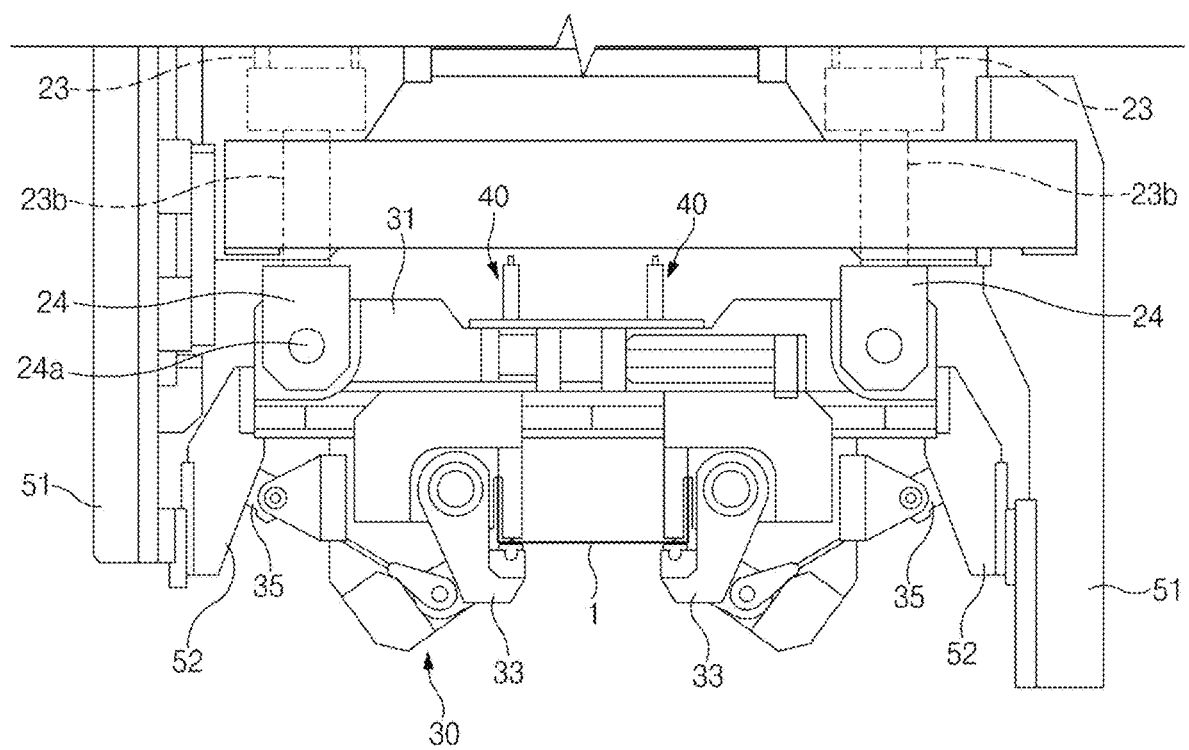
FIG. 10 is a view illustrating a state in which two clamp arms of the apparatus for correcting a vehicle member are completely contracted to clamp the vehicle member according to an exemplary embodiment of the present invention.

As illustrated in FIG. 13, when the rods 35a of the clamp cylinders 35 are moved forwards at a full stroke, the guide bosses 36d of the sliders 36 are moved to lower end portions of the guide grooves 33d of the clamp arms 33, and accordingly, the two clamp arms 33 may be pivoted in a direction in which the clamp arms 33 are completely contracted as illustrated in FIG. 10 so that the vehicle member 1 may be clamped by the two clamp arms 33. As illustrated in FIG. 3, when the sliders 36 are moved to lower end portions of the clamp arms 33, repulsive forces may be applied between the sliders 36 and the clamp arms 33 so that the locations of the sliders 36 and the clamp arms 33 may be self-locked.

As illustrated in FIG. 6, slider guides 38 that guide movements of the sliders 36 may be disposed in the second plates 34.

The sliders 36 may have guide surfaces 36b formed on surfaces of the sliders 36, which are opposite to the guide bosses 36d, and the guide surfaces 36d may be curved to have a specific radius. Each of the slider guides 38 may have guide surfaces 38a and 38b that guide the guide surface 36b of the corresponding slider 36.

The guide surfaces 38a and 38b of the slider guide 38 may include a first guide surface 38a that guides upward movement of the slider 36 and a second guide surface 38b that guides downward movement of the slider 36. The first guide surface 38a and the second guide surface 38b are inclined at specific angles, and the inclination angle of the first guide surface 38a may be greater than the inclination angle of the second guide surface 38b.

The correction apparatus according to an exemplary embodiment of the present invention may perform a correction operation of correcting deflection and twisting of the vehicle member 1 as the rods 23a of the two correction cylinders 23 are individually moved forwards and rearwards while the clamp device 30 clamps the vehicle member 1.

Figure 15:
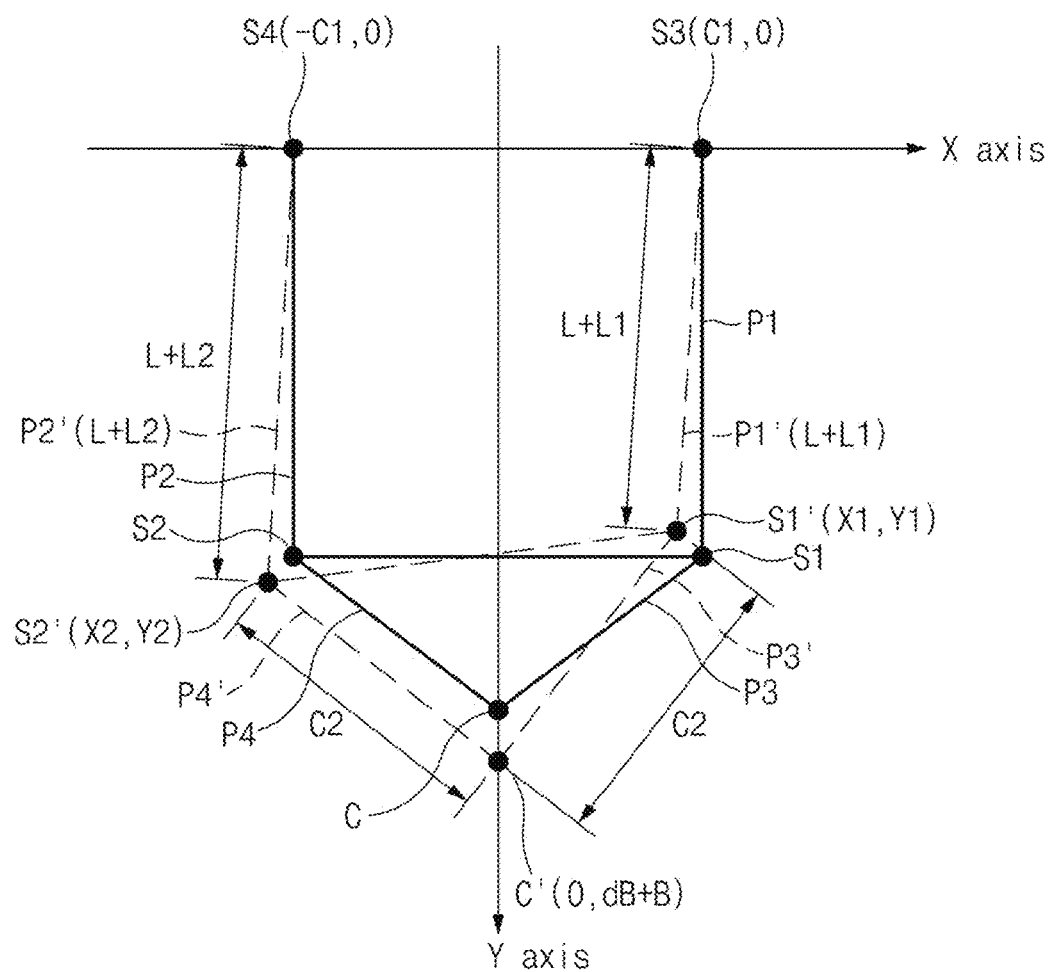
FIG. 15 is a kinematic diagram of the correction device of FIG. 3.

FIG. 15 is a kinematics diagram of FIG. 3, and illustrates a kinematic relationship of correction degrees of the correction cylinders on the X-Y coordinate system.

In FIG. 3 and FIG. 15, C denotes a correction center located between the two clamp arms 33, P1 denotes a first extension line P1 virtually extending between the pivot shaft 23a of the right correction cylinder 23 and the pivot shaft 24a of the right pivot member 24 of FIG. 3, P2 denotes a second extension line P2 virtually extending between the pivot shaft 23a of the left correction cylinder 23 and the pivot shaft 24a of the left pivot member 24 of FIG. 3, P3 denotes a third extension line P3 virtually extending between the pivot shaft 24a of the right pivot member 24 and the correction center C, P4 denotes a fourth extension line P4 virtually extending between the pivot shaft 24a of the left pivot member 24 and the correction center C, S1 denotes a center point of the pivot shaft 24a of the right pivot member 24, S2 denotes a center point of the pivot shaft 24a of the left pivot member 24, S3 denotes a center point of the pivot shaft 23a of the right correction cylinder 23, and S4 denotes a center point of the pivot shaft 23a of the left correction cylinder 23.

In FIG. 15, P1' represents that the first extension line P1 is changed as the rod 23b of the right correction cylinder 23 is moved forwards and rearwards, P2' represents that the second extension line P2 is changed as the rod 23b of the left correction cylinder 23 is moved forwards and rearwards, P3' represents that the third extension line P3 is changed as the pivot shaft 24a of the right pivot rod 24 is moved, P4' represents that the fourth extension line P4 is changed as the pivot shaft 24a of the right pivot rod 24 is moved, S1' represents that the center point S1 is changed as the pivot shaft 24a of the right pivot member 24 is moved, S2' represents that the center point S2 is changed as the pivot shaft 24a of the left pivot member 24 is moved, C' represents that the correction center C is changed by the correction operations of the correction cylinder 23, and the coordinates of S3 and S4 are not changed.

The coordinate of S1' is denoted by (X1, Y1), the coordinate of S2' is denoted by (X2, Y2), the coordinate of C' is denoted by (0, B+dB), the coordinates of S3 is denoted by (C1, 0), the coordinate of S4 is denoted by (−C1, 0), the length of P1' is L+L1, and the length of P2' is L+L2.

Here, B denotes a vertical length between a reference point (O, 0) of the coordinate system and the correction center C before a correction operation of the correction cylinders 23, dB denotes a degree of correction of deflection by a correction operation of the correction cylinders 23, L denotes a length of the correction cylinders 23 before forward and rearward movement of the correction cylinders 23, L1 is a change of the length of the right correction cylinder 23 by forward and rearward movement of the rod 23a of the right correction cylinder 23, L2 is a change of the length of the left correction cylinder 23 by forward and rearward movement of the rod 23a of the left correction cylinder 23, θ is a degree of correction of twisting by a correction operation of the correction cylinders 23, and C2 denotes the length of P3 correction The change L1 of the length of the right correction cylinder 23 may be expressed by Equation 1.

$$L1 = \sqrt{\left(\begin{array}{c} C2^2 - 2C1 \times C2 \times \cos(\theta + a) - 2 \times C2 \times \\ (B + dB) \times \sin(\theta + a) + C1^2 + (B + dB)^2 \end{array}\right)} - L \quad \text{[Equation 1]}$$

The change L2 of the length of the left correction cylinder 23 may be expressed by Equation 2.

$$L2 = \sqrt{\left(\begin{array}{c} C2^2 - 2C1 \times C2 \times \cos(\theta - a) + 2 \times C2 \times \\ (B + dB) \times \sin(\theta - a) + C1^2 + (B + dB)^2 \end{array}\right)} - L \quad \text{[Equation 2]}$$

As the rod 23a of the left correction cylinder 23 and the rod 23a of the right correction cylinder 23, which are configured in the present way, are individually moved forwards and rearwards, the twisting and defection of the vehicle member 1 may be corrected.

Figure 16:
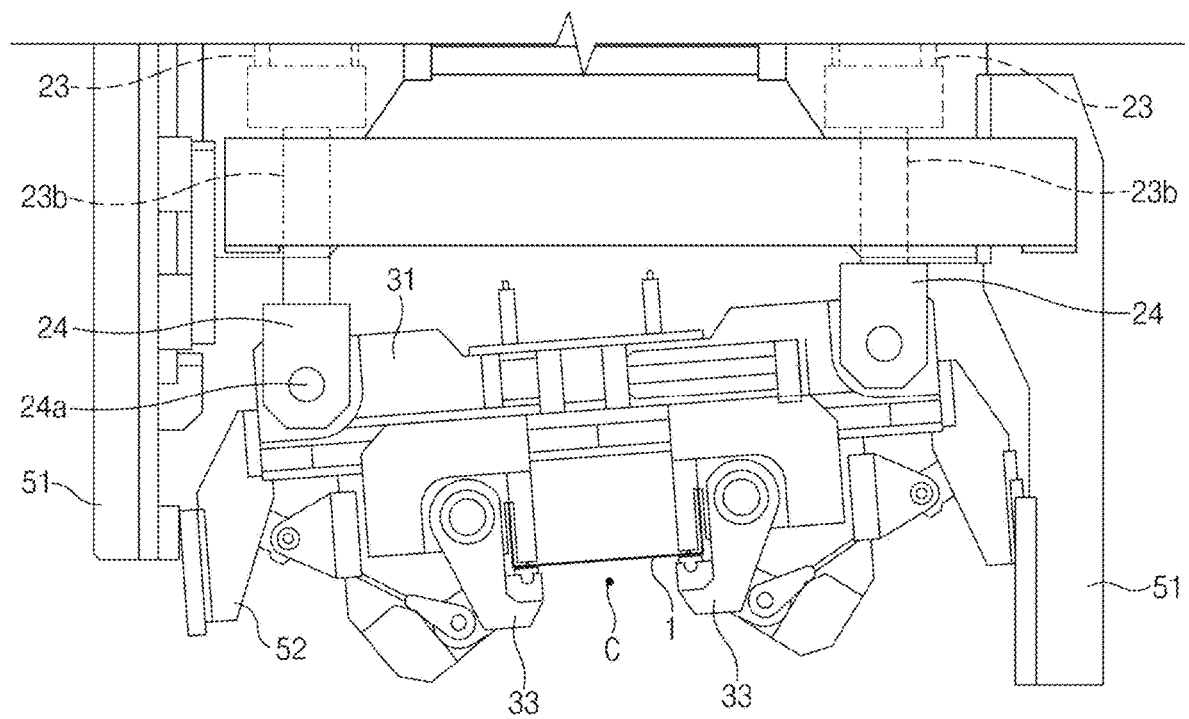
FIG. 16 is a view illustrating a state in which twisting of the vehicle member is corrected by allowing the rod of the left correction cylinder to move farther than the rod of the right correction cylinder, in the correction device of the apparatus for correcting a vehicle member according to an exemplary embodiment of the present invention.
Figure 17:
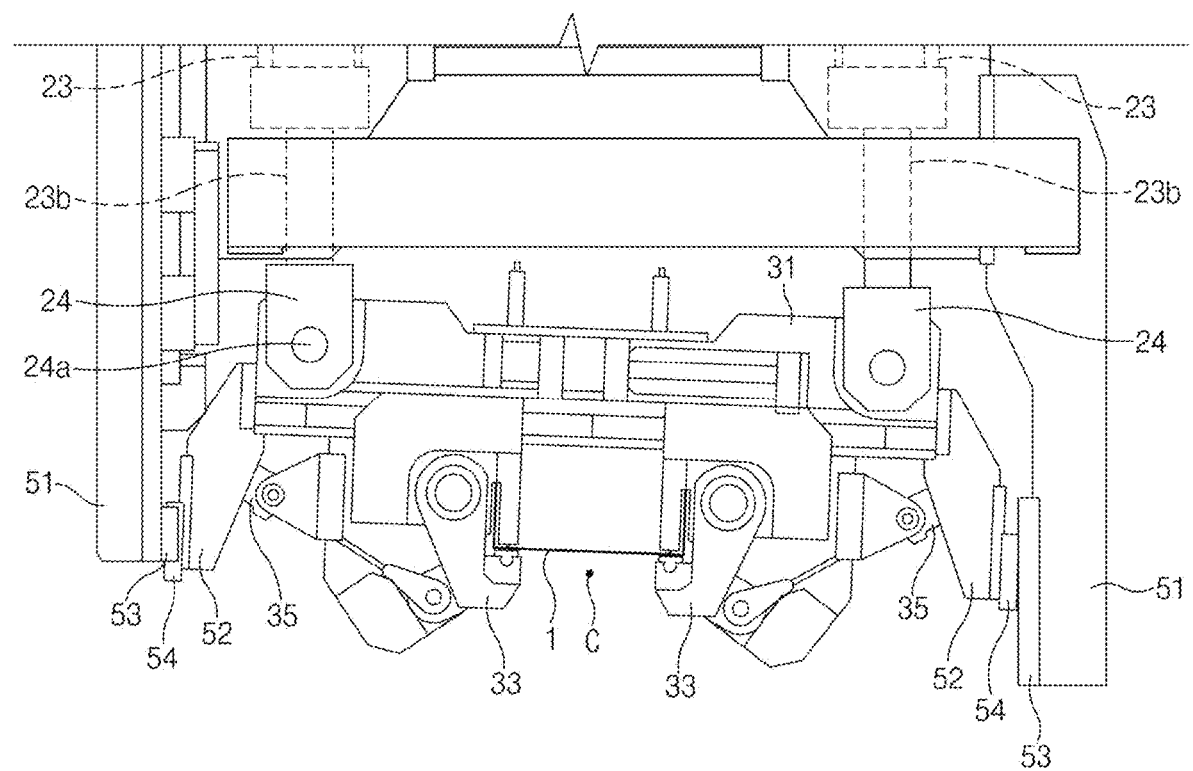
FIG. 17 is a view illustrating a state in which twisting of the vehicle member is corrected by allowing the rod of the right correction cylinder to move farther than the rod of the left correction cylinder, in the correction device of the apparatus for correcting a vehicle member according to an exemplary embodiment of the present invention.

As exemplified in FIG. 16 and FIG. 17, as the rod 23a of the left correction cylinder 23 and the rod 23a of the right correction cylinder 23 are moved forwards and rearwards in opposite directions while the clamp device 30 clamps the vehicle member 1, the twisting of the vehicle member 1 may be corrected.

Figure 18:
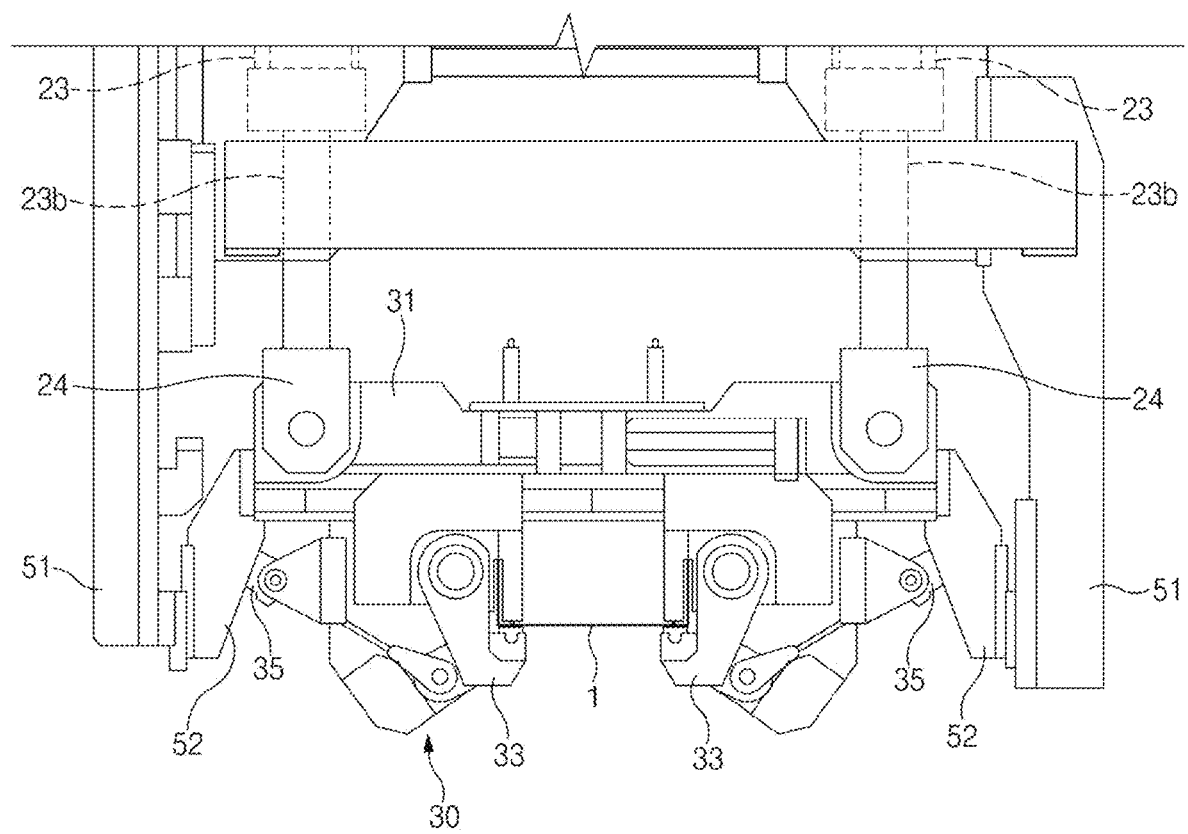
FIG. 18 is a view illustrating a state in which twisting of the vehicle member is corrected by allowing the rods of the left correction cylinder and the right correction cylinder to move in the same direction, in the correction device of the apparatus for correcting a vehicle member according to an exemplary embodiment of the present invention.

As exemplified in FIG. 18, as the rod 23a of the left correction cylinder 23 and the rod 23a of the right correction cylinder 23 are driven in the same direction while the clamp device 30 clamps the vehicle member 1, the deflection of the vehicle member 1 may be corrected.

When the rod 23a of the left correction cylinder 23 and the rod 23a of the right correction cylinder 23 are moved forwards and rearwards in opposite directions as illustrated in FIG. 16 and FIG. 17, the clamp device 30 may be rotated about the correction center C, and when the rods 23a of the two correction cylinders 23 are moved forwards and rearwards by the same stroke in the same direction as illustrated in FIG. 18, the clamp device 30 may be moved vertically. Accordingly, the correction device 20 according to an exemplary embodiment of the present invention may further include a guide structure for stably guiding rotation and vertical movement of the clamp device 30.

Figure 7:
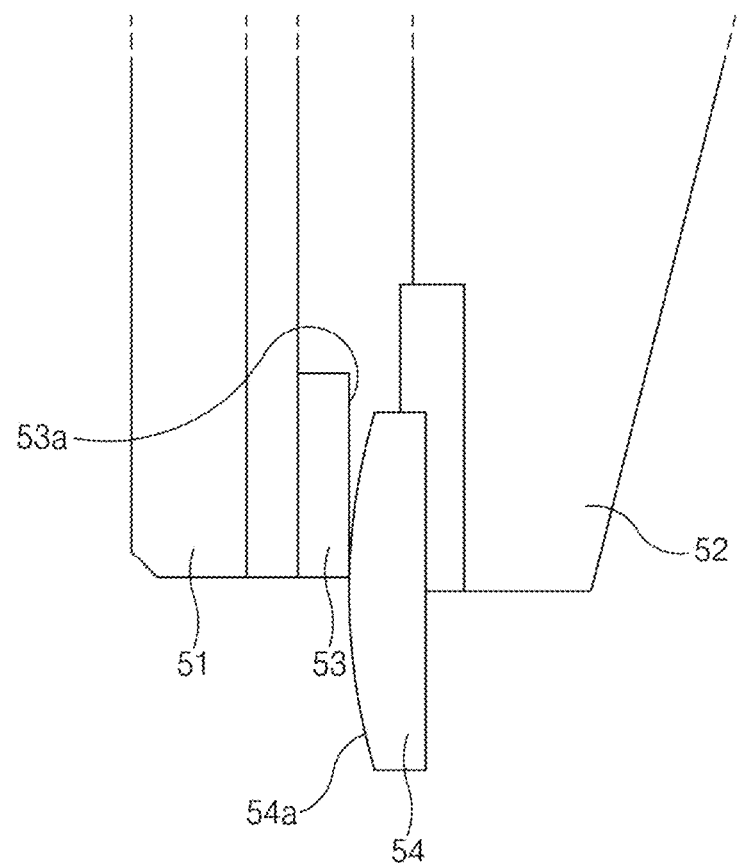
FIG. 7 is a view illustrating a portion of arrow C of FIG. 5 in detail.

As illustrated in FIG. 3 and FIG. 7, the guide structure may include two first guide members 51 disposed on the left and right sides of the correction body 21, and two second guide members 52 disposed on opposite sides of the clamp device 30.

A first contact member 53 having a first contact surface 53a is fixed to each of the first guide members 51, and a second contact member 54 having a second contact surface 54a is fixed to each of the second guide members 52. As the first contact surface 53a of the first contact member 53 and the second contact surface 54a of the second contact member 54 contact each other, the rotation and vertical movement of the clamp device 30 may be stably guided.

According to an embodiment, as exemplified in FIG. 7, the first contact surface 53a is formed flat, and the second contact surface 54a may have a curve having a specific radius with respect to the correction center C. Accordingly, the first contact surface 53a and the second surface 54a may stably guide the rotation or vertical movement of the clamp device 30 while linearly contacting each other.

Further, the first contact member 53 and the second contact member 54 may be formed of an anti-wear material in consideration of wear.

According to an exemplary embodiment of the present invention, the correction device 20 may further include two measurement devices 40 that measure deflection and twisting of the vehicle member 1 clamped by the clamp device 30.

Referring to FIG. 5, the measurement devices 40 may be disposed in the clamp devices 30 to determine a degree of deflection and a degree of twisting of the vehicle member 1.

Figure 19:
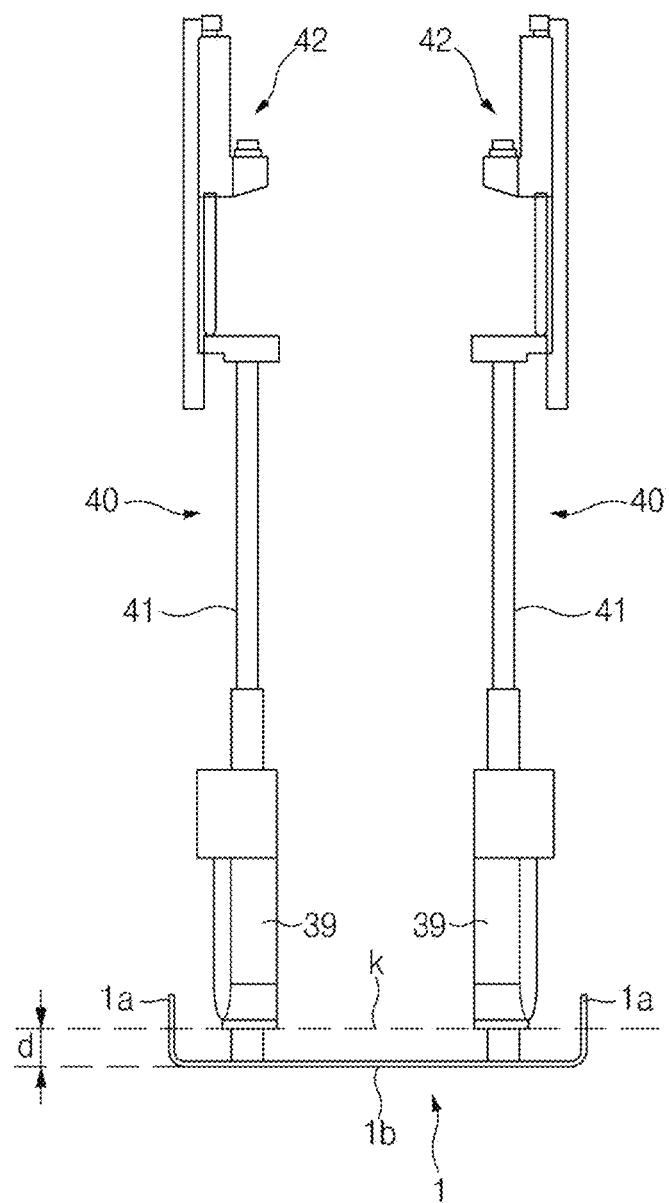
FIG. 19 is a view illustrating a measurement device of the correction apparatus according to an exemplary embodiment of the present invention, and illustrates a state in which a degree of deflection of the vehicle member is measured.
Figure 20:
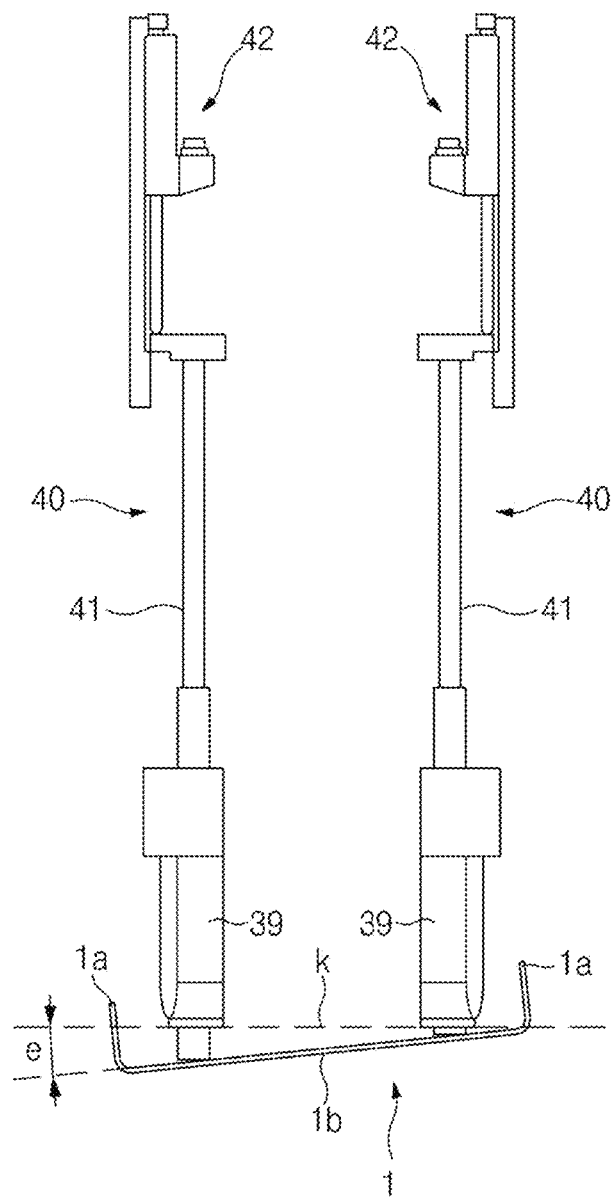
FIG. 20 is a view illustrating a measurement device of the correction apparatus according to an exemplary embodiment of the present invention, and illustrates a state in which a degree of twisting of the vehicle member is measured.

As illustrated in FIG. 5, FIG. 19, and FIG. 20, each of the measurement devices 40 may include a pair of probes 41 disposed to be movable vertically while passing through the clamp block 39 of the corresponding clamp device 30, and a pair of linear encoders 42 individually disposed at upper end portions of the probes 41.

Through the configuration, because the linear encoders 42 detect displacements of the probes 41 as the lower end portions of the two probes 41 individually contact opposite sides of the vehicle member 1 to be displaced, a degree (d) of deflection of the vehicle member 1 may be measured with reference to a measurement reference line (k) as illustrated in FIG. 19 and a degree of twisting of the vehicle member 1 may be measured with reference to a measurement reference line (k) as illustrated in FIG. 20.

Figure 14:
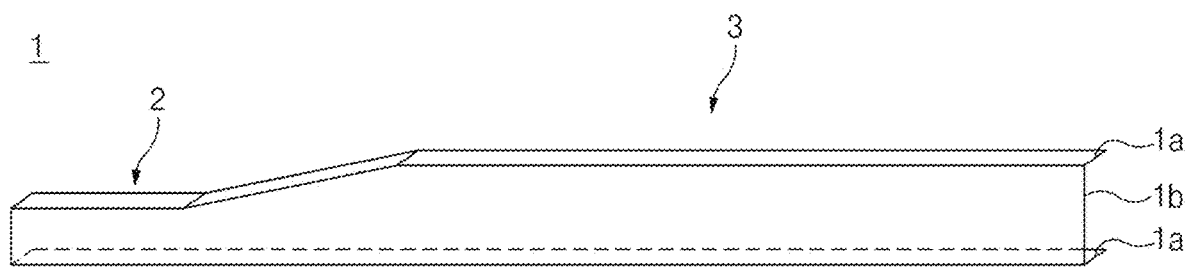
FIG. 14 is a view illustrating, as an example, one form of the vehicle member corrected by the correction apparatus according to an exemplary embodiment of the present invention.

FIG. 14 exemplifies one form of the vehicle member 1 corrected by the correction apparatus according to an exemplary embodiment of the present invention, and the vehicle member 1 may have a flange 1a and a web 1b and may have a structure extending in a lengthwise direction thereof. The vehicle member 1 may have a structure having a small width part 2 and a large width part 3.

According to an exemplary embodiment of the present invention, as illustrated in FIG. 1, some 20a of the plurality of correction devices 20 may have a structure having only a clamp device 30 without having a correction cylinder 23. Accordingly, the correction devices 20a perform only a function of primarily clamping the vehicle member 1, and may include a primary clamp correction device 20a that does not perform correction of the vehicle member 1.

However, the other correction devices 20b and 20c of the plurality of correction devices 20 may include both the correction cylinder 23 and the clamp device 30. The correction devices 20b and 20c may be classified into a small width part correction device 20b that clamps and corrects the small width part 2 of the vehicle member 1 exemplified in FIG. 14, and a large width part correction device 20c that clamps and corrects the large width part 3 of the vehicle member 1. Accordingly, the small width part 2 and the large width part 3 of the vehicle member 1 may be individually corrected.

Figure 21:
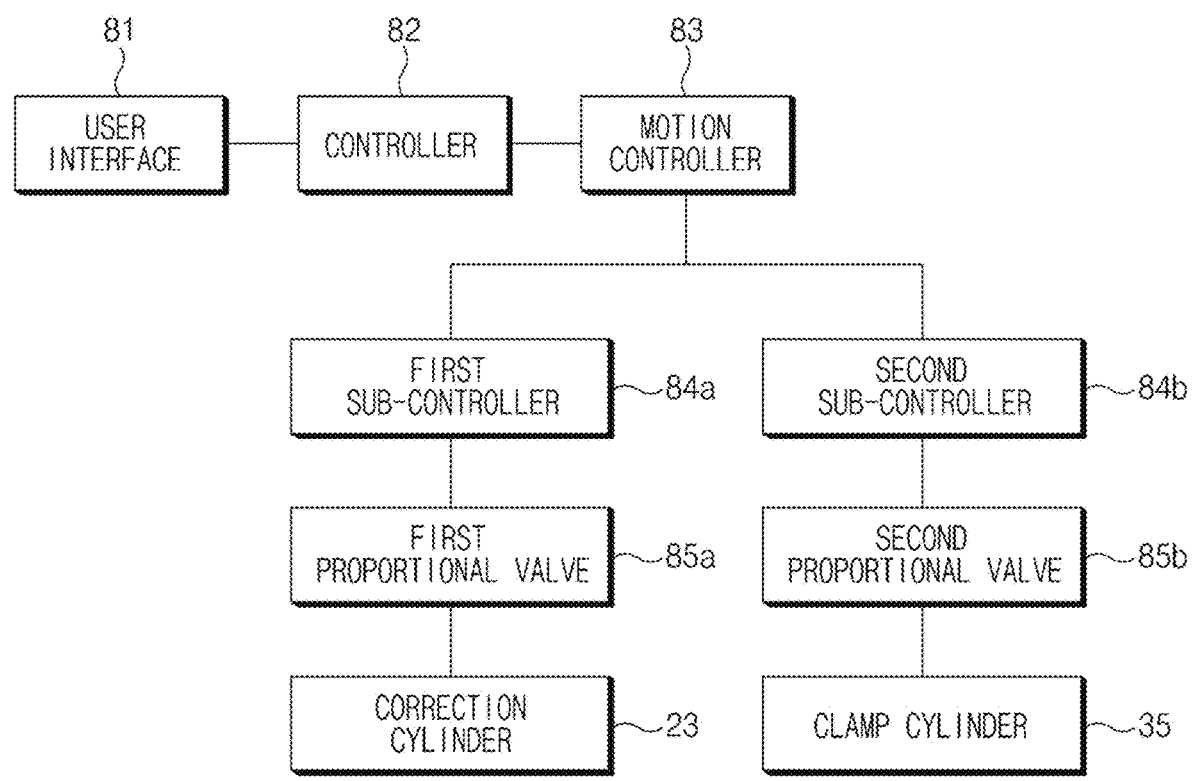
FIG. 21 is a control block diagram of the apparatus for correcting a vehicle member according to an exemplary embodiment of the present invention.

FIG. 21 is a control block diagram of the apparatus 100 for correcting a vehicle member according to an exemplary embodiment of the present invention.

Referring to FIG. 21, the apparatus may include a human-machine interface (HMI) 81, a main control device 82 configured to generate a control signal for sequence-controlling the plurality of correction devices 20; 20a, 20b, and 20c, a motion controller 83 configured to generate motion control signals of the correction cylinders 24 of the correction devices 20; 20a, 20b, and 20c in response to a control signal of the main control device 82, a plurality of first sub-controllers 84a configured to individually control the correction cylinders 23 of the correction devices 20; 20b, and 20c, a plurality of second sub-controllers 84b configured to individually control the clamp cylinders 35 of the correction devices 20; 20a, 20b, and 20c, a plurality of first proportional control valves 85a individually connected to the correction cylinders 23 of the correction devices 20; 20b, and 20c, and a plurality of second proportional control valves 85b individually connected to the clamp cylinders 35 of the correction devices 20; 20a, 20b, and 20c.

A control signal by a user and data may be input to the user interface 81, and the user interface 81 may manage correction data and the like.

The main controller 82 may be connected to the user interface 81 to communicate with the user interface 81 through Ethernet. The main controller 82 may include a programmable logic controller to monitor and control the correction apparatus 100.

The motion controller 83 may be connected to the main controller 82 to communicate with the main controller 82 through Ethernet such as PROFINET.

The motion controller 83 may be configured to generate a motion control signal for executing a motion control (a deflection/twisting correcting operation) for the correction cylinders 23 of the correction devices 20; 20b, and 20c. For example, the motion controller 83 may be configured to implement motion operations of the correction cylinders 23 by Equations 1 and 2 while a virtual master shaft is rotated once.

The plurality of first sub-controllers 84a and the plurality of second sub-controllers 84b may be connected to the motion controller 83 to communicate with the motion controller 83 through Ethernet such as PROFINET.

Figure 22:
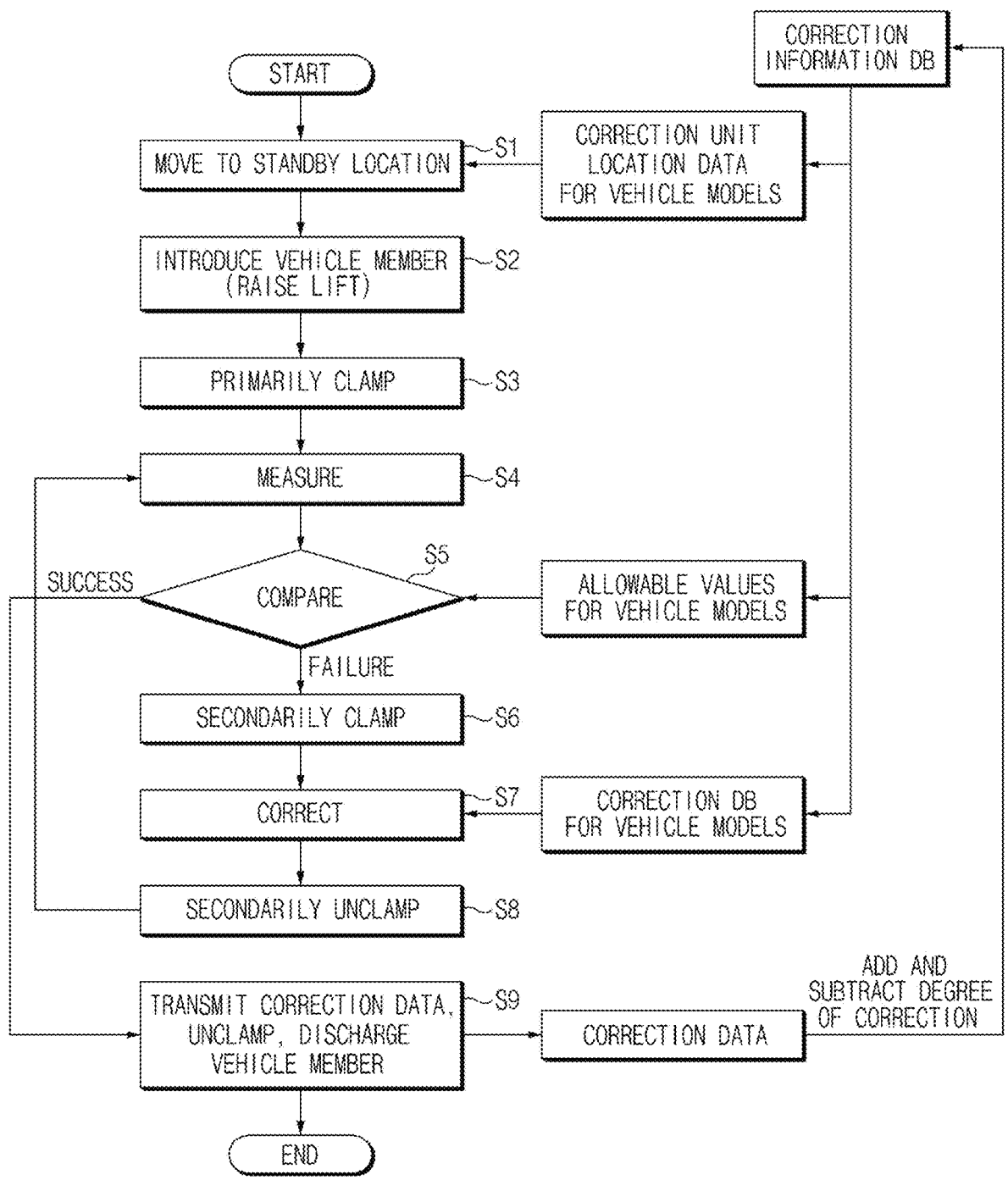
FIG. 22 is a flowchart illustrating a method for correcting a vehicle member according to an exemplary embodiment of the present invention.

FIG. 22 is a flowchart illustrating a method for correcting a vehicle member according to an exemplary embodiment of the present invention.

The plurality of correction devices 20; 20a, 20b, and 20c may be fed to standby locations on the base 11. Then, the standby locations of the correction devices 20; 20a, 20b, and 20c may be set by extracting location data of the correction devices 20; 20a, 20b, and 20c for vehicle models from correction information data of the user interface 81 (S1).

After the vehicle member 1 is introduced into the apparatus 100 for correcting a vehicle member by a plurality of feeding conveyors 61, the vehicle member 1 is lifted towards the plurality of correction devices 20; 20a, 20b, and 20c by a plurality of lifters 62 (S2).

The vehicle member 1 is primarily clamped by the clamp device 30 of the primary clamp correction device 20a, which has only the clamp device 30, of the plurality of correction devices 20 (S3).

The primarily clamped vehicle member 1 is measured by the measurement device 60 (S4), and the measured value is compared with allowable values for vehicle models and a success or a failure is determined (S5).

When it is determined in operation S5 that the value measured by the measurement device 40 agrees with the allowable values for vehicle models, a success may be determined, and accordingly, the vehicle member 1 is unclamped and discharged (S9).

When it is determined in operation S5 that the value measured by the measurement device 40 does not agree with the allowable values for vehicle models, a failure may be determined, and accordingly, the vehicle member 1 is secondarily clamped by the clamp devices 30 of the plurality of correction devices 20 and the clamp devices 30 of the correction devices 20b and 20c having the correction cylinders 23 (S6).

After the second clamping, the deflection and twisting of the vehicle member 1 is corrected by controlling the correction cylinders 23 of the correction devices 20b and 20c (S7). Then, operations of the correction cylinders 23 may be controlled by extracting correction data for vehicle models from the correction information data of the user interface 81.

The vehicle member 1 is unclamped (S8) after the correction is completed, and the process returns to operation S4 so that the corrected vehicle member 1 is measured by the measurement device 40, and when it is determined in operation S5 that a success is determined, the correction data is transmitted to the user interface 81 and the vehicle member 1 is unclamped and discharged (S9).

According to an exemplary embodiment of the present invention, twisting or deflection of a vehicle member including a side member of the vehicle, may be precisely corrected by use of a clamp device and a correction cylinder of a correction device.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards" and "backwards" are used to described features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for correcting a vehicle member, the apparatus comprising:
    a base extending in a lengthwise direction thereof; and
    a plurality of correction units disposed on the base to be movable,
    wherein a first predetermined number of the plurality of correction units have clamp devices configured to clamp the vehicle member, and
    wherein a second predetermined number of the plurality of correction units have clamp devices configured to clamp the vehicle member, and correction cylinders configured to correct the vehicle member clamped by the clamp devices,
    wherein measurement devices configured to measure the vehicle member are disposed in the clamp devices, and
    wherein each of the measurement devices includes a probe disposed to be movable vertically while passing through the corresponding clamp device, and a linear encoder disposed at an upper end portion of the probe.

2. A method for correcting the vehicle member by use of the apparatus claimed in claim 1, the method comprising:
    introducing the vehicle member into the plurality of correction units;
    primarily clamping the vehicle member;
    measuring the primarily clamped vehicle member by the measurement device;
    determining a success or a failure by comparing a value measured by the measurement device with a predetermined value; and
    when the measured value corresponds to the failure, correcting the vehicle member after secondarily clamping the vehicle member.

3. The method of claim 2, further including:
    measuring the value of the vehicle member after the vehicle member is corrected; and
    comparing the value measured by the measurement device with the predetermined value and when the measured value corresponds to the success, unclamping and discharging the vehicle member.

* * * * *